3,236,024
BANDING APPARATUS

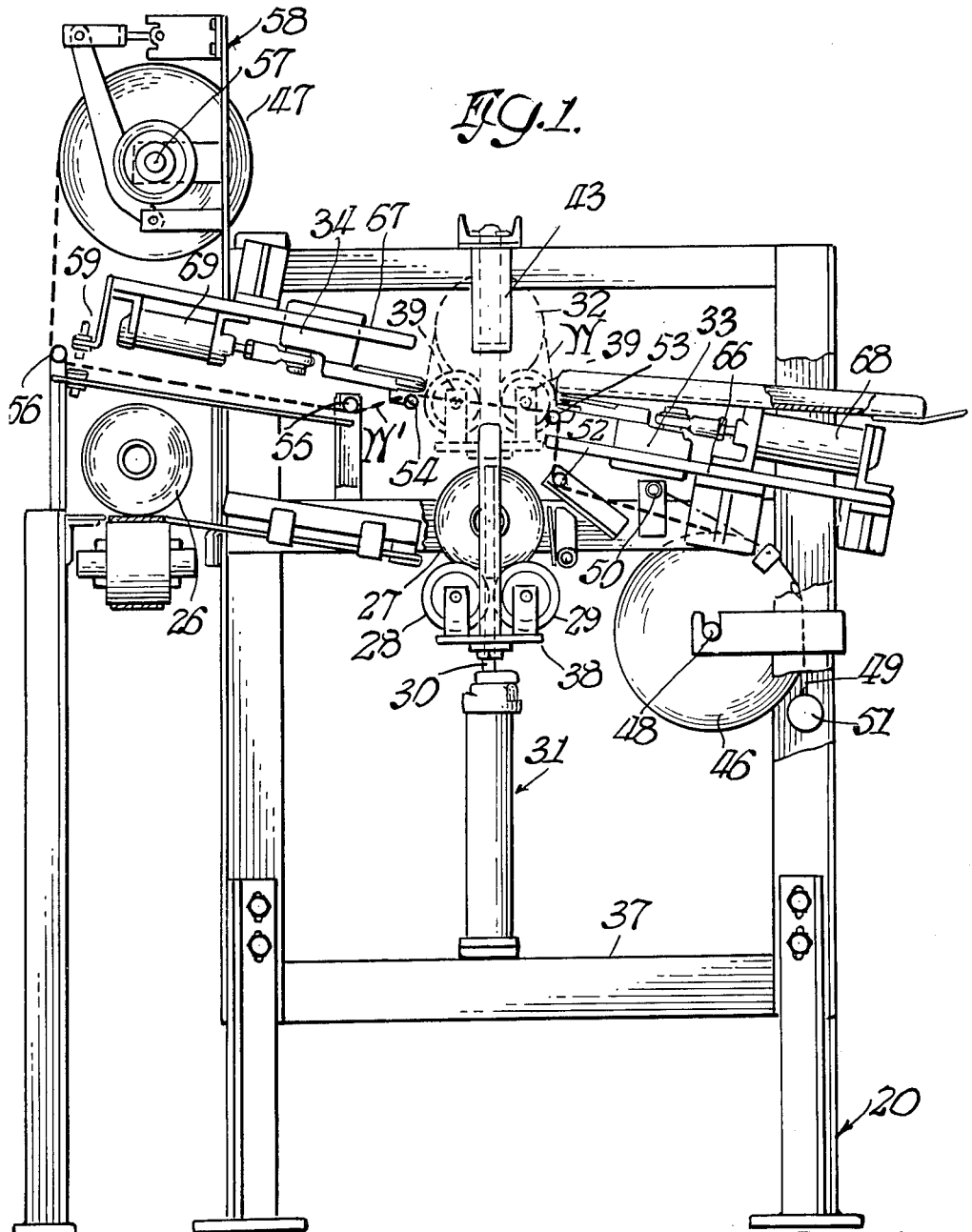

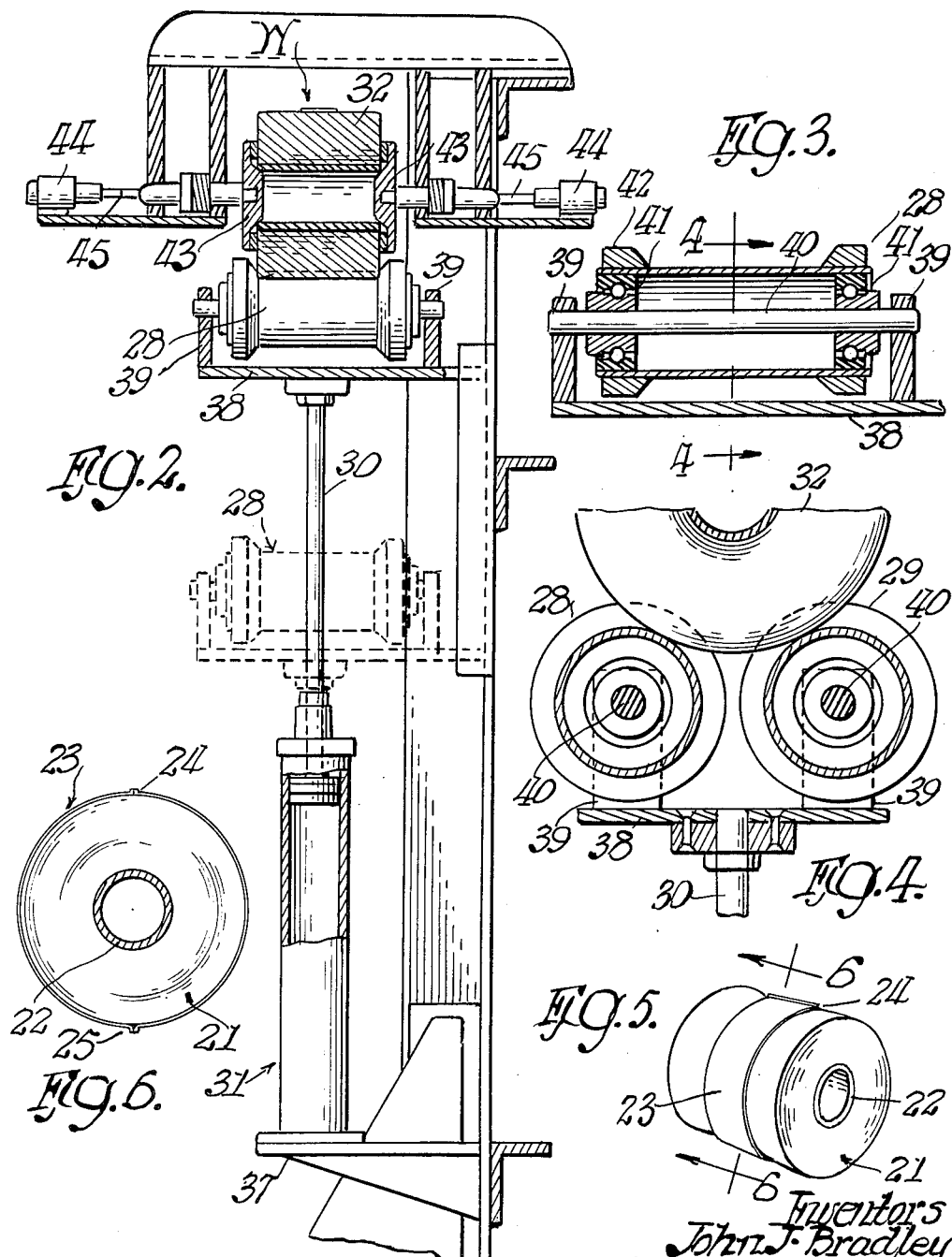

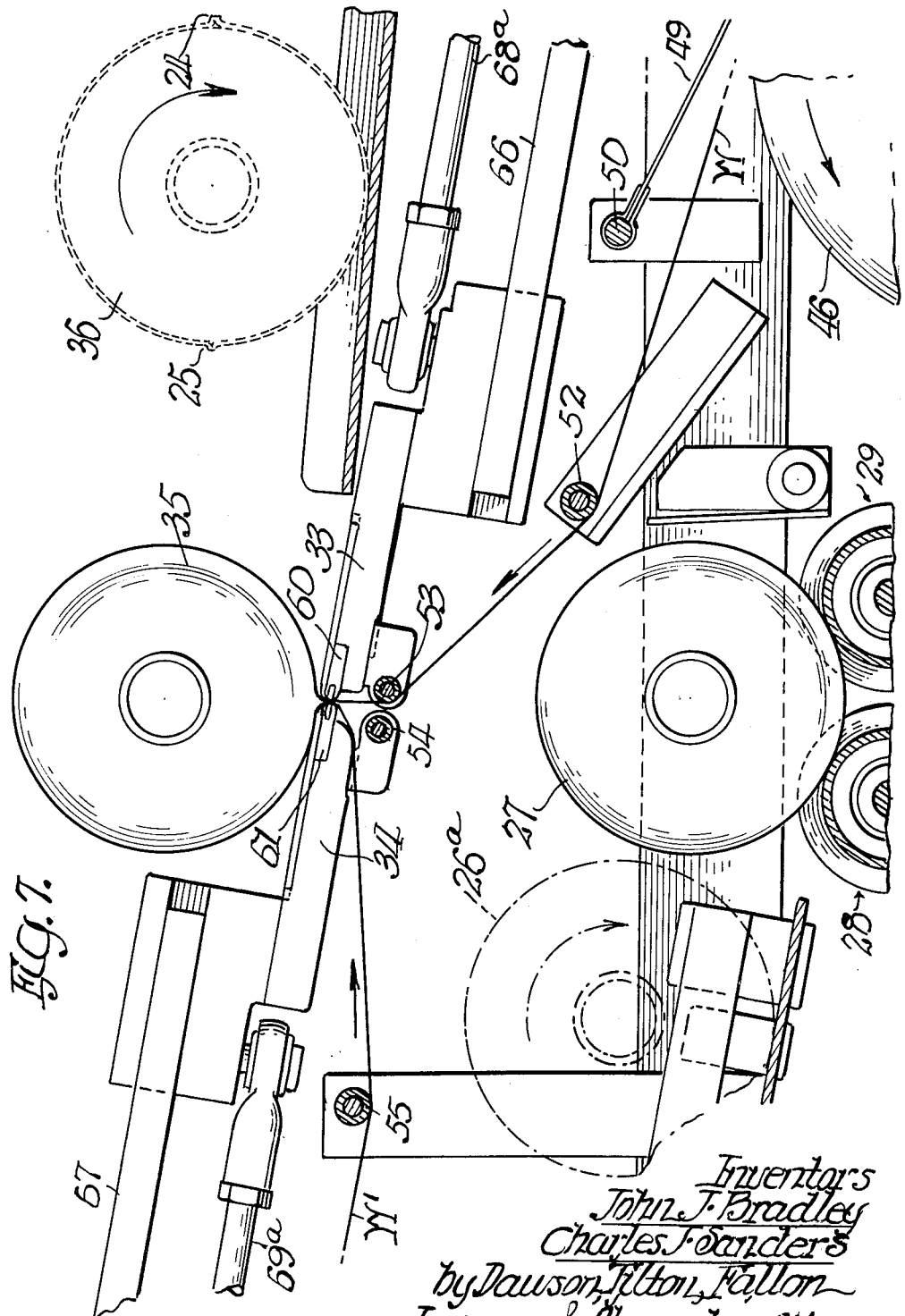

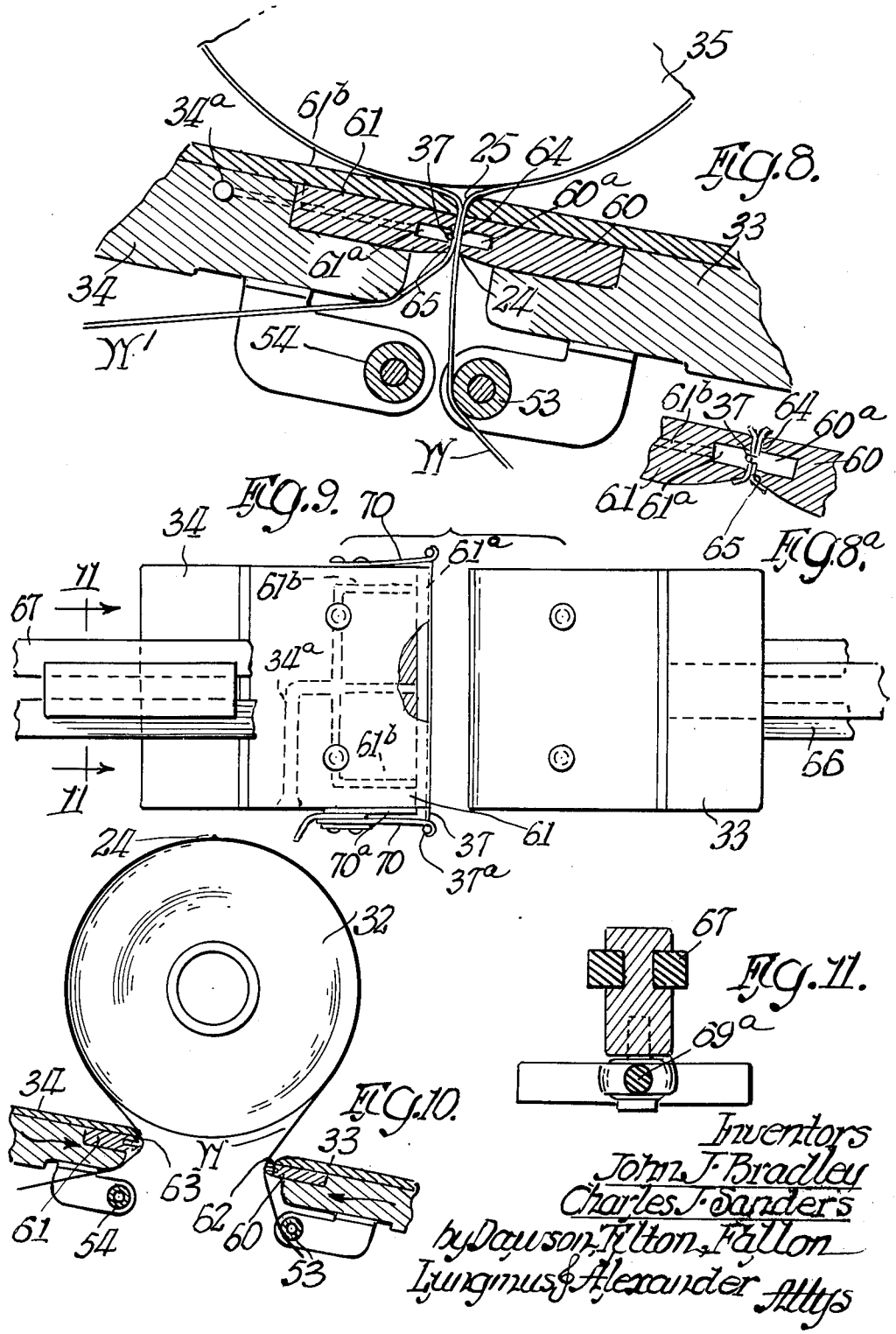

John J. Bradley, Green Bay, and Charles J. Sanders, De Pere, Wis., assignors to Paper Converting Machine Co., Inc., Green Bay, Wis.
Filed Oct. 26, 1962, Ser. No. 237,429
2 Claims. (Cl. 53—198)

This invention relates to a banding apparatus and method, and, more particularly, to apparatus and method for encircling objects with a thermoplastic wrapper.

The invention finds particular utility in connection with paper products such as rolls of toilet tissue, stacks of folded paper towels, etc. However, more durable objects may be satisfactorily wrapped or banded.

Although banding of articles with thermoplastic webs has been known, the art has not been practiced widely and with perishable goods because of the expense involved, particularly in the time necessary and the complex machinery required. These drawbacks are avoided in the instant invention and the provision of an apparatus and method for achieving banding with a polyethylene web, for example, constitutes an important object of the invention.

Another object of the invention is to provide an apparatus and method employing a thermoplastic web wherein objects to be banded can be wrapped at high speed and in continuous fashion, all while maintaining a continuous web for banding a subsequent article or object.

Still another object of the invention is to provide a unique arrangement of heat-sealing parts and a method of use thereof wherein an intermediate portion of a web can be banded to itself and severed from the continuous web while yielding a continuous web.

Other objects and advantages of the invention may be seen in the details of construction and operation set down in this specification.

The invention is described in conjunction with an illustrative embodiment in the accompanying drawing, in which:

FIG. 1 is an elevational view of a portion of a machine embodying the inventive teaching;

FIG. 2 is a fragmentary side elevation, partially in section, of the structure seen in FIG. 1 and on slightly enlarged scale;

FIG. 3 is a fragmentary enlarged section of a portion of the machine seen in FIG. 2;

FIG. 4 is a sectional view, taken along the sight line 4—4 applied to FIG. 3;

FIG. 5 is a perspective view of a paper roll after the same has been banded according to the inventive teaching;

FIG. 6 is a sectional view, on enlarged scale, taken along the sight line 6—6 applied to FIG. 5;

FIG. 7 is an enlarged fragmentary elevational view of the central portion of the apparatus as seen in FIG. 1 and taken at the time a banding operation is completed;

FIGS. 8 and 8A are enlarged fragmentary views of the central portion of FIG. 7;

FIG. 9 is a fragmentary top view showing the sealing and cut-off jaws seen in side elevation in FIG. 8;

FIG. 10 is a view similar to FIGS. 1 and 8 but at a time when the elements are in a condition between the conditions depicted respectively in FIGS. 1 and 8; and FIG. 11 is a sectional view, on enlarged scale, taken along the sight line 11—11 applied to FIG. 9.

With particular reference to FIG. 1, the numeral 20 designates generally a portion of a machine frame employed for finishing rolls of paper such as toilet tissue rolls seen in FIGS. 5 and 6 and which are designated generally by the numeral 21. In FIGS. 5 and 6, the roll is seen to be equipped with a core 22 and a circumferential or perimetric band generally designated 23. The band 23 is seen to include beads or lines of union 24 and 25 (the latter only being seen in FIG. 6).

Operation in general

The invention contemplates relative movement between a roll to be banded and a thermoplastic web wherein the roll enters the apparatus at the position designated 26 in FIG. 1. Under the influence of gravity, the roll proceeds to the position designated 27, where it is cradled between supporting rolls 28 and 29. The supporting rolls 28 and 29 are mounted on the end of a piston rod 30 provided as part of a cylinder and piston rod unit generally designated 31. When the rod 30 is extended, as seen in FIG. 2, the roll cradled on the supporting rolls 28 and 29 assumes the position designated 32 in FIG. 1, where the previously taut web W has now been brought into partial wrapping relation with the roll in the position 32. Thereupon, the rod 30 is retracted while the roll is clamped by the brackets 43.

The next stage of the operation contemplates relative movement of jaws 33 and 34 toward each other and under the roll in the position 32 as seen in FIG. 10. Ultimately, the jaws 33 and 34 achieve the configuration seen in FIG. 8 and wherein the roll condition is designated 35. This condition 35 is also seen in FIG. 7, where the final condition of a banded roll is designated 36. The FIG. 8 showing reveals that the second bead or linear heat-seal 25 is being developed, while a heated wire 37 severs the web to provide a new bead as at 24 (still referring to FIG. 8) for the next operation.

It will be appreciated, therefore, that the jaws 33 and 34 cooperate to provide linear heat-seals in the thermoplastic web that are spaced longitudinally of the web and that the wire 37 severs the web between these two seals. Thus, an object is banded and the web W is in perfect condition for a subsequent banding operation.

In the general illustration just given, the objects to be banded are rolls, so that gravity transfer from position to position can be utilized—as at 26a, which designates an intermediate position between the positions 26 and 27 of FIG. 1, the 26a condition being designated in FIG. 7. However, where the objects are noncylindrical, other relocating means can be conveniently employed.

It will also be appreciated that the relative movement between the web W and the roll in the position 27 of FIGS. 1 and 7 can be achieved by moving the web toward the roll and still achieve the benefits of the invention. In the illustration given, however, it is preferred to move the roll relative to the web W and the structure responsible for this will now be described.

Relative movement-producing mechanism

As mentioned previously, the object in the station 27 to be wrapped is elevated by the cylinder and piston rod unit 31. The unit 31, as seen in FIGS. 1 and 2, is supported on a cross member 37 provided as part of the frame 20. The upper end of the piston rod 30 is equipped with a pedestal 38 (see FIG. 2) which in turn supports posts 39 (compare FIGS. 1 and 3). Mounted in aligned posts 39 is a shaft 40, and two such shafts are provided, one for each of the supporting cradle rolls 28 and 29 (see FIG. 4). The supporting rolls 28 and 29 are each interiorly equipped with ball bearings as at 41 (again referring to FIG. 3), and are exteriorly equipped with tapered flanges as at 42 for confining a web roll as at 32 in FIG. 2. The roll in the position 32 is stabilized by brackets 43 (see FIGS. 1 and 2), which are in alignment and urged inwardly by air cylinders 44 which are mounted as part of the frame 20. In other words, when the cylinder and piston rod 31 extends its piston rod 30, and hence the cradling rolls 28 and 29, to the uppermost condition seen in FIG. 2, the air cylinders 44 extend their associated rods 45 to bring the confining brackets 43 into the position shown in FIG. 2.

Meanwhile, the web W is unwound from the parent rolls 46 and 47 (see FIG. 1) to assume the partial wrapping condition seen in FIG. 1. For this purpose, the jumbo roll 46 is freely journaled in the frame 20 as at 48, with the unwinding of the web from the roll 46 being restrained by a gravity brake 49. The brake 49 includes a length of leather or other tough material supported at one end as at 50 on the frame 20. The other end is equipped with a weight, as at 51, so that over-unwinding of the jumbo roll 46 is prevented. Normally, the web is in the condition designated W' in FIG. 1, i.e., before the elevation of a roll to be banded from the position 27 to the position 32. This is achieved through the provision of idler rolls or guide bars as at 52, 53, 54, 55 and 56 on the frame 20. The other end of the web W' is provided as part of the other jumbo roll 47.

The jumbo roll 47 is also journaled in the frame 20 as at 57, and the free unwinding of this jumbo roll is retarded by a mechanical brake device generally designated 58 and which, in one embodiment of the invention, is controlled by a photocell device generally designated 59. For this purpose, the web W' may be equipped with register marks or other indicia to which the photocell apparatus 59 is sensitive, so that only a discrete portion of the jumbo roll 47 is unwound each operation. This determines the relative locations of the linear beads 24 and 25. It will be appreciated that the jumbo roll 47, instead of being unwound, may be wound after each banding operation, so that there results only one union 24 on each roll 21.

After the object to be wrapped is in the position designated 32 in FIG. 1, the jaws 33 and 34 are brought together as indicated by the arrows in FIG. 10. This results in a bringing together of longitudinally spaced-apart portions of the web W into contacting relation, as seen in FIG. 8. The jaw elements at 60 and 61 serve as clamps to join and hold the banding material for cut-off and welding, bringing together the spaced-apart portions designated 62 and 63 in FIG. 10 to provide the spaced-apart unions as at 64 and 65 in FIG. 8A (ultimately beads 25 and 24, respectively). The cut-off device is the hot wire 37, and the material which is exposed to the heat from the wire 37 in the slotted area of the clamps is melted to an extent that the webs part near the center of the slots. The cohesive action of the molten material causes it to form a welded bead on each side of the slots where the two webs are protruding into the slots. The clamps, acting as a heat sink, arrest the welding action and also cool the weld after the current to the wire is shut off. The current is stopped before the heat can become so intense that the material in the weld is burned or damaged.

Aiding in quickly cooling the welded material is an air blast developed from a conduit 34a in the jaw 34 which communicates with the slot 61a by means of a branch conduit 61b (see FIGS. 8 and 9). Air is metered to the sealing cavity defined by the slots 60a and 61a by a solenoid valve (not shown) for a period of about one second, following the heat pulse in the wire, the pressure of the air being set at about 30–50 p.s.i.

For this purpose, each jaw 33 and 34 is mounted on a guide as at 66 and 67 (see FIG. 1). The movement of the jaws 33 and 34 is provided by cylinder units 68 and 69 also attached to the guides 66 and 67, respectively. The guide 67 can be seen in FIGS. 9 and 11, as can the piston rod 69a provided as part of the cylinder and piston rod unit 69. The jaws 33 and 34, at their confronting ends, may be equipped with the idler rolls or guide bars 53 and 54 previously referred to.

Each jaw element 60 and 61, as seen in FIG. 8, is equipped with a horizontal slot as at 60a and 61a, respectively. This spaces the jaw portions apart so as to develop the spaced-apart seals as at 64 and 65. Positioned in the slot 61a is the wire 37, which is advantageously supported upon spring clips 70 (see FIG. 9).

*Example*

As a specific example of the invention, the pictured apparatus was employed for the banding of rolls of toilet tissue which contained the usual 650 or 1000 count of 4½" square sections, separated by transverse perforations. For this operation, polyethylene of varying thicknesses was applied as the thermoplastic web material, the range of thickness being 0.0003–0.002", i.e., 0.3–2.0 mils. The polyethylene material was 2" wide, and the separation of the web between the adjacent seals 64 and 65 was achieved through the use of Nichrome V wire having a diameter of 0.020", energized by 6-volt A.-C. current for approximately 0.4 second.

In FIG. 9, the wire 37 is seen to be equipped with end lugs which may be T-shaped for receipt within the bifurcated ends of the clips 70. The clips 70 are suitably insulated as at 70a from the jaw element 61 to provide a means for supplying current to the wire 37 from a remote source of E.M.F. (not shown).

In the particular illustration referred to, the vertical dimension of the slots 60a and 61a was 0.0625", and the depth of the slots ¼". In each case, the underside of the U-shaped jaw elements 60 and 61 was beveled on a 15° angle as at 60' to provide jaw thicknesses at the ends of 0.0625".

In the instant invention, the sealing system produces a seam which we consider a "bead" seam. This is achieved through melting the two surfaces of the thermoplastic material, i.e., the polyethylene, and controlling the extent of the melting action to form two beads as at 64 and 65 in FIG. 8A of the molten plastic which become the band seams when cooled. The heat from the wire 37 melts the plastic webs and the molten plastic forms the bead seals ultimately becoming 24 on the remaining web, and 25 on the released portion of the web. The energization of the hot wire is for so short a time that the clamps 33 and 34 remain cool enough to prevent the plastic webs from sticking to the clamps, also the cool clamps act as heat sinks to limit the melting action and cause the molten bead to solidify into a seam. The bead seam made with this invention is actually stronger than the original plastic web, there being no distortion of the web beyond the bead seal. Thus, the invention is adapted to bead seal two or more moving webs of plastic while slitting the webs at the same time. Due to the "heat sink" action of the clamps 33 and 34 and, for that matter, the roll or object being wrapped, and the fact that the plastic is melted, not just softened, it is not necessary to closely control the temperature of the hot wire. All that is necessary is that the wire be hot enough to fuse the plastic, a temperature of 1000–1500° F. being satisfactory for polyethylene of the thicknesses indicated. This is readily perceived by heating the wire 37 for a time and under a voltage just necessary to make the wire glow.

Pressure is completely removed as a sealing variable, since no pressure at all is applied in the seal area. Also, the time employed for the sealing operation is readily determined in operation and is not critical, as in contemporary installations. Present lap seam methods are very sensitive in this connection, particularly in producing wrinkles, which is not a problem with the inventive procedure.

While in the foregoing specification a detailed description of an embodiment of the invention has been set down for the purpose of illustration, many variations in the details herein given may be made by those skilled in the art without departing from the spirit and scope of the invention.

We claim:

1. Apparatus for banding rolls of toilet tissue, and the like, comprising a frame, first and second web-wound rolls rotatably supported on said frame in spaced-apart relation to provide a web portion of thermoplastic material extending therebetween, a vertically disposed cylinder and piston rod unit mounted on said frame between said rolls and below the said extending web portion, cradle means secured to said unit and adapted to sequentially receive toilet tissue rolls for upward movement into contact with said extending web portion upon extension of said unit to cause said web portion to conform to a part of said toilet tissue roll, means on said frame for sequentially delivering toilet tissue rolls to said cradle means, toilet tissue roll clamping means reciprocably mounted on said frame for clampingly supporting a toilet tissue roll in contact with said web portion upon retraction of said unit and cradle means, a pair of opposed jaws reciprocably mounted on said frame for engagement with said web portion below said toilet tissue roll when the same is supported by said clamping means, each jaw including a block equipped with a generally horizontally-extending slot in the face thereof in confronting relation with the other jaw, an electrically energizable heat sealing wire in one of said slots, and means on said frame for removing a banded toilet tissue roll following retraction of said jaws.

2. Apparatus for banding rolls of toilet tissue, and the like, comprising a frame, first and second web-wound rolls rotatably supported on said frame in spaced-apart relation to provide a web portion of thermoplastic material extending therebetween, a vertically disposed cylinder and piston rod unit mounted on said frame between said rolls and below the said extending web portion, cradle means secured to said unit and adapted to sequentially receive toilet tissue rolls for upward movement into contact with said extending web portion upon extension of said unit to cause said web portion to conform to a part of said toilet tissue roll, means on said frame for sequentially delivering toilet tissue rolls to said cradle means, toilet tissue roll clamping means reciprocably mounted on said frame for clampingly supporting a toilet tissue roll in contact with said web portion upon retraction of said unit and cradle means, a pair of opposed jaws reciprocably mounted on said frame for engagement with said web portion below said toilet tissue roll when the same is supported by said clamping means, each jaw including a block equipped with a generally horizontally-extending slot in the face thereof in confronting relation with the other jaw, an electrically energizable heat sealing wire in one of said slots, air flow passage means in the jaw equipped with said sealing wire for directing an air blast about said sealing wire and the seals developed in said web portion by said jaws and wire, and means on said frame for removing a banded toilet tissue roll following retraction of said jaws.

References Cited by the Examiner

UNITED STATES PATENTS

| | | | |
|---|---|---|---|
| 2,047,486 | 7/1936 | Meyer-Jagenburg | 53—229 X |
| 2,741,885 | 4/1956 | Allison | 53—198 |
| 2,767,535 | 10/1956 | Bentley | 53—198 |
| 3,060,658 | 10/1962 | Horsting | 53—198 X |
| 3,097,462 | 7/1963 | Langdon | 53—198 X |

FRANK E. BAILEY, *Primary Examiner.*

TRAVIS S. McGEHEE, *Examiner.*